United States Patent
Badura

(10) Patent No.: US 6,192,558 B1
(45) Date of Patent: Feb. 27, 2001

(54) MECHANICAL TRUCKER'S KNOT, WITH LOCKING CLASP, AND METHOD OF USE

(76) Inventor: Michael W. Badura, 7072 S. Sunshine St., Las Vegas, NV (US) 89118-5270

(*) Notice: Subject to any disclaimer, the term of this patent is extended or adjusted under 35 U.S.C. 154(b) by 0 days.

(21) Appl. No.: 09/322,016

(22) Filed: May 28, 1999

Related U.S. Application Data

(60) Provisional application No. 60/091,833, filed on Jul. 6, 1998.

(51) Int. Cl.$^7$ .................................................. F16B 45/02
(52) U.S. Cl. ...................................... 24/599.1; 24/599.6
(58) Field of Search ............................... 24/132 R, 599.1, 24/599.4, 599.5, 599.6, 599.7, 599.8, 599.9, 600.1, 600.2, 265 H, 601.5, 321, 131 R, 129 C, 598.2, 573.5, 115 R; 43/14

(56) References Cited

U.S. PATENT DOCUMENTS

| | | |
|---|---|---|
| 371,690 * | 10/1887 | Kistner . |
| 525,770 | 9/1894 | Parker . |
| 544,628 * | 8/1895 | Neer . |
| 630,837 | 8/1899 | Anderson et al. . |
| 779,279 * | 1/1905 | Hastings . |
| 947,111 | 1/1910 | Lorentz . |
| 1,356,316 | 8/1920 | Shepherd . |
| 1,452,338 | 4/1923 | Flowers . |
| 1,565,041 | 12/1925 | Arney . |
| 1,599,040 | 9/1926 | Clisby . |
| 1,613,635 | 1/1927 | Zimmerlund . |
| 1,718,641 | 6/1929 | Forman . |
| 2,194,967 * | 3/1940 | Beers, Sr. . |
| 2,595,806 | 5/1952 | Morris . |
| 3,296,670 | 1/1967 | Burnett . |
| 3,438,098 | 4/1969 | Grabner . |
| 3,678,543 * | 7/1972 | Hobbs . |
| 3,728,762 | 4/1973 | Hogg . |
| 4,034,443 | 7/1977 | Turner . |
| 4,414,712 | 11/1983 | Beggins . |
| 4,719,668 * | 1/1988 | Cavanaugh . |
| 4,872,240 | 10/1989 | Spinner et al. . |
| 4,910,834 * | 3/1990 | Minkler . |
| 4,918,785 | 4/1990 | Spinner et al. . |
| 5,287,645 * | 2/1994 | Gois . |
| 5,416,955 * | 5/1995 | Katsma . |
| 5,423,146 * | 6/1995 | Hystad . |
| 5,505,013 * | 4/1996 | Gois . |
| 5,517,949 * | 5/1996 | Harris et al. . |
| 5,577,299 | 11/1996 | Thompson et al. . |
| 5,864,929 * | 2/1999 | Sakong . |

* cited by examiner

*Primary Examiner*—James R. Brittain
(74) *Attorney, Agent, or Firm*—Stephen Christopher Swift; Swift Law Office

(57) ABSTRACT

A device that assists in the tying of knots for tightening lines, especially ropes that hold heavy loads in place on trucks or flat bed trailers. In the preferred embodiment, the invention comprises two side members, two transverse members, and a clasping member. The clasping member moves between a closed position in which the side members, the lower transverse member and the clasping member form a closed loop, and an open position in which there is an opening between the side members. The clasping member is spring loaded and biased toward the closed position. One side member is turned back to form a hook, the end of which engages the clasping member in its closed position. The upper ends of the side members extend above the upper transverse member to form ears that prevent a rope tied around that member from slipping off. The preferred method of using the device includes the following steps: Doubling a line to form a loop; pulling the loop between the transverse members; pulling the loop around the bottom portion and then up to top portion of the device; pulling the line to tighten the loop around the upper transverse member between the ears; moving the clasping member to the open position; pulling the bottom portion of the line through the gap created by opening the clasping member; releasing the clasping member so that it returns to the closed position; and securing the bottom portion of the line to the bottom portion of the device.

8 Claims, 7 Drawing Sheets

US 6,192,558 B1

MECHANICAL TRUCKER'S KNOT, WITH LOCKING CLASP, AND METHOD OF USE

CROSS REFERENCE TO RELATED APPLICATION

This application is based on Provisional Patent Application Ser. No. 60/091,833, filed Jul. 6, 1998.

BACKGROUND OF THE INVENTION

1. Field of the Invention

The present invention relates to mechanical devices that assist in knot tying, and methods of tying knots using such devices.

2. Description of the Prior Art

When heavy loads need to be retained during transportation, as on a flat bed truck or trailer, it is desirable to secure them as tightly as possible. Ropes holding the loads in place may be tied around the objects, and then the slack removed from the ropes by tying "trucker's knots" in the ropes, so that the ropes are retained as tightly as possible. However, "trucker's knots" are difficult to tie, and if not tied correctly, may come undone, resulting in loss of the load. The present invention is a device that makes it possible to tie such knots more easily and securely. The following are some of the knot tying devices in the prior art:

U.S. Pat. No. 525,770, issued on Sep. 11, 1894, to Edward F. Parker, discloses a rope hitching device, having a concave plate from which two spiral sleeves extend in opposite directions, for attached two ends of a rope together to secure the rope to a hitching post.

U.S. Pat. No. 630,837, issued on Aug. 15, 1899, to Anton L. Anderson and Carl M. Roland, discloses a rope clamp having a pair of tubular members, and opposite semitubular members being spaced apart and forming a continuation of the respective divergent members. A rope passes through the divergent members forming a bight, and one end of the rope is passed through openings between the semitubular members and under the bight, thus forming a loop in the rope.

U.S. Pat. No. 947,111, issued on Jan. 18, 1910, to Henry E. Lorentz, discloses a cord holder, for adjusting the length of a cord from which an object such as an electric light or telephone receiver hangs, by forming a readily variable loop in the cord. It has passages in which the cord is frictionally retained, and an opening in which the loop may be formed and adjusted.

U.S. Pat. No. 1,356,316, issued on Oct. 19, 1920, to George W. Shepard, discloses an adjustable bight holding attachment for cords, having a medial belay portion or spine terminating at each end in a hook, eye or equivalent lateral extension.

U.S. Pat. No. 1,452,338, issued on Apr. 17, 1923, to William J. Flowers, discloses a rope and cable tie, having a channel member with a U-shaped cross section in which a portion of the rope is inserted, with slots through which another portion of the rope is inserted, thus forming a loop.

U.S. Pat. No. 1,565,041, issued on Dec. 8, 1925, to Frank J. Arney, discloses an adjusting loop device, for joining the ends of two separate ropes, having two eyes, and a fork-shaped extension with a groove near one eye around which a rope can be wrapped.

U.S. Pat. No. 1,599,040, issued on Sep. 7, 1926, to Roy E. Clisby, discloses a rope tying or binding device, with a wedging recess and an eye on each side of the recess.

U.S. Pat. No. 1,613,635, issued on Jan. 11, 1927, to John O. E. Zimmerlund, discloses a rope fastening device, comprising a plate with two holes, with one of the holes being transversely enlarged.

U.S. Pat. No. 1,718,641, issued on Jun. 25, 1929, to Henry E. Forman, discloses a rope fastener, consisting of two side bars united by transverse members, and a pin adapted to extend through openings in reinforcements in the side bars.

U.S. Pat. No. 2,595,806, issued on May 6, 1952, to Edward L. Morris, discloses a rope fitting, having an aperture through which an end of the rope can pass, and a hook or other means for attachment to other devices.

U.S. Pat. No. 3,296,670, issued on Jan. 10, 1967, to Lauren W. Burnett, discloses a rope fastening device, comprising a shaft around which the rope can be secured, with two eyelets through which it can pass.

U.S. Pat. No. 3,438,098, issued on Apr. 15, 1969, to Floyd V. Grabner, discloses a slack takeup device for a rope or cable, including an elongated spine with a hook extending from each end of the spine.

U.S. Pat. No. 3,728,762, issued on Apr. 24, 1973, to James W. Hogg, discloses a knot assembly for cables, formed by inserting a cable through holes in metal rods and bending it around the rods and itself. Each of the metal rods is curved to form any eye on each end of the rod.

U.S. Pat. No. 4,034,443, issued on Jul. 12, 1977, to Roland P. Turner, discloses a knot-tying device, for securing a loop in a line or cord, comprising a rigid tapered body having an aperture adjacent to an apex of the body and another aperture in the center of the body.

U.S. Pat. No. 4,414,712, issued on Nov. 15, 1983, to Paul T. Beggins, discloses a line fastening device, that can hold and form an eye in a line without the use of a knot, having an elongated body with passageways extending between its ends.

U.S. Pat. No. 4,872,240, issued on Oct. 10, 1989, to Raphael F. Spinner et al., discloses a steel knot for ropes, comprising two rounded metal rings held together by a plurality of connectors.

U.S. Pat. No. 4,918,785, issued on Apr. 24, 1990, to Raphael F. Spinner, deceased, and Clement F. Marley, discloses a mechanical knot for ropes, comprising a length of pipe or tube with one or more elongated slotted portions in its walls, or alternatively a base plate with an elongated slot and two right angle shoulders with holes.

U.S. Pat. No. 5,577,299, issued on Nov. 26, 1996, to Carl W. Thompson and Carl R. Foster, discloses a quick-release mechanical knot apparatus, comprising a semi-rigid elongated stock member having at least two circular orifices formed at opposing ends of a curvilinear intermediate portion.

None of the above inventions and patents, taken either singly or in combination, will be seen to describe the instant invention as claimed.

SUMMARY OF THE INVENTION

The invention is a knot tying device, having in a preferred embodiment a first side member to which a locking clasp is pivotally connected, a second side member with a hooked portion to which the locking clasp is engaged when in a closed position, and two transverse members connecting the side members. When used to secure a load to a trailer, one end of the rope is tied to the trailer, and the rope is placed above the load, laying on the load. The invention is then placed in the rope. A portion of a rope to be tightened can be wound around the upper transverse member, which may have a knurled edge to prevent the rope from slipping. The remaining length of the rope is then wrapped around a hook or through a loop on the trailer. Then a portion of the rope is brought back to the invention and inserted through the locking clasp. Finally, the user pulls on the rope to tighten it, and ties the rope around the hooked portion of the invention to hold it in place. When the user pulls on the rope, the hook or loop on the trailer and the hooked portion of the invention act as wheels on a pulley.

Accordingly, it is a principal object of the invention to provide an improved means for tightening ropes or other lines that secure loads being transported.

It is another object of the invention to provide a device that makes it easier to tie "trucker's knots".

It is a further object of the invention to provide a device that makes it less likely that "trucker's knots" will come untied.

Still another object of the invention is to provide a means of tying knots that secure loads that makes it easier to untie the knots when it is time to release the loads.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention a device that assists in the tying of knots for tightening ropes or other lines, especially ropes that hold heavy loads in place on trucks or flat bed trailers.

Figure 1:
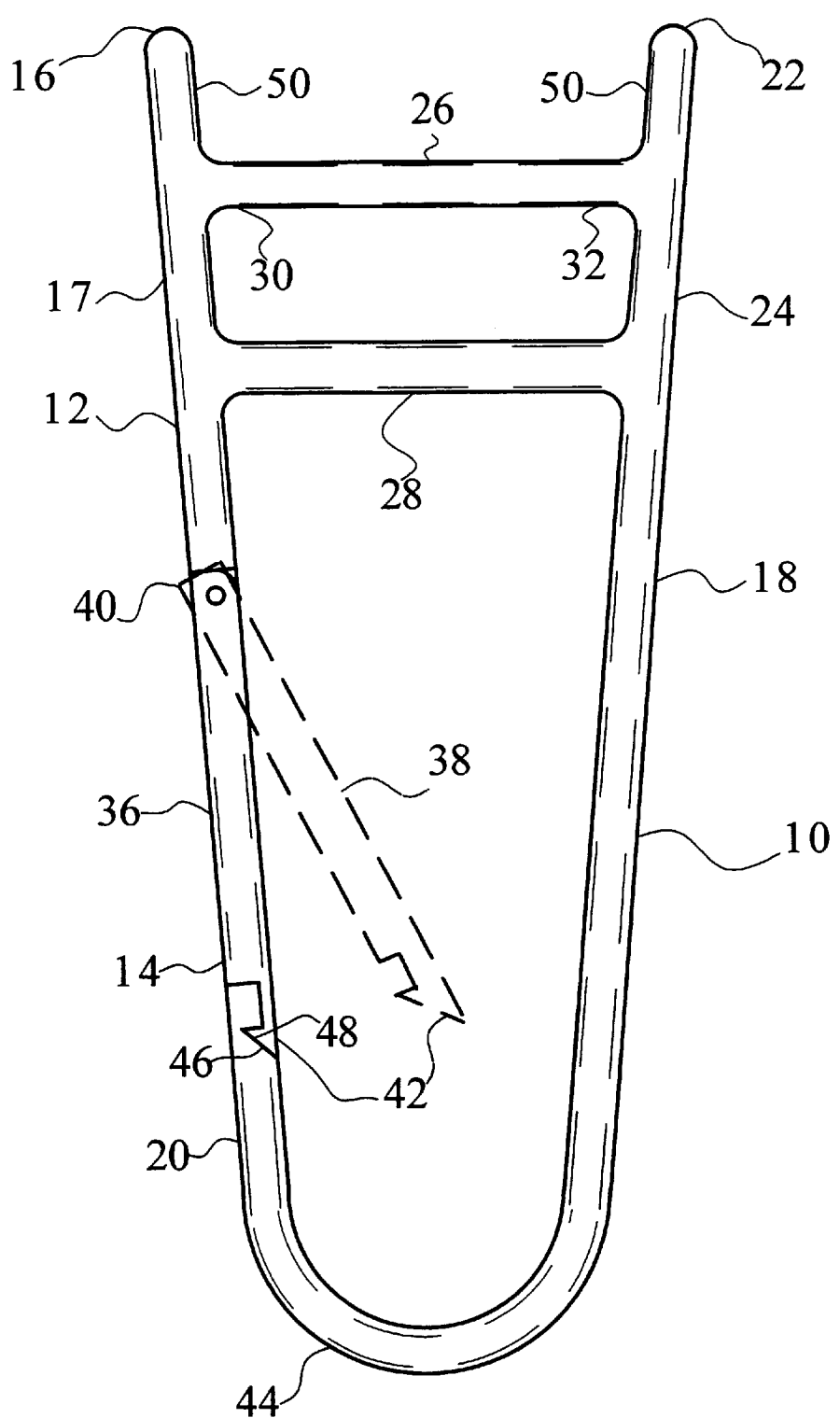
FIG. 1 is a front elevational view of the preferred embodiment of the invention.

In the preferred embodiment, as shown in FIG. 1, the mechanical trucker's knot 10 comprises a first side member 12, having a first end 14, a second end 16, and an intermediate portion 17; a second side member 18, having a first end 20, a second end 22, and an intermediate portion 24; a first transverse member 26 and a second transverse member 28, the transverse members being parallel and each having a first end 30 joined to the intermediate portion of the first side member, and a second end 32 joined to the intermediate portion of the second side member; and a clasping member. The first transverse member may have either a smooth surface, or a knurled surface to prevent a line wrapped around it from slipping. The clasping member moves between a closed position 36 (shown in solid lines) in which the first side member, the second side member, the transverse member and the clasping member form a closed loop, and open positions 38 (one of which is shown in broken lines) in which there is an opening between the first end of the first side member and the first end of the second side member. The clasping member has a first end 40 that is pivotally connected to the first end of the first side member, and a second end 42 that in the closed position is retained on the first end of the second side member, and in the open position is not so retained. The clasping member is spring loaded and biased toward the closed position. In the preferred embodiment, the second side member is longer than the first side member, and the first end of the second side member is turned back to form a hook 44. The hook may function in a manner similar to the wheel of a pulley when the line is pulled tight. The second end of the clasping member has extensions 46 that matingly engage grooves 48 in the first end of the second side member, so that they may be more securely retained when in a closed position.

Preferably, all parts of the invention, including the first and second side member, the transverse member, and the locking clamp are made of a metal that is strong and will not easily rust, such as stainless steel or aluminum. The parts may be painted or otherwise coated to prevent rust. Preferably, the first side member, the second side member, the transverse member, and the locking clamp are solid, and have, except at their ends, circular cross sections, the centers of which all lie in a single plane. In the preferred embodiment, the second ends of the first and second side members extend an equal distance from the transverse members to form ears 50. Alternatively, the ears may extend from the first transverse member (not shown in drawings). The purpose of the ears is to prevent a line tied around the first transverse member from slipping off.

Figure 2:
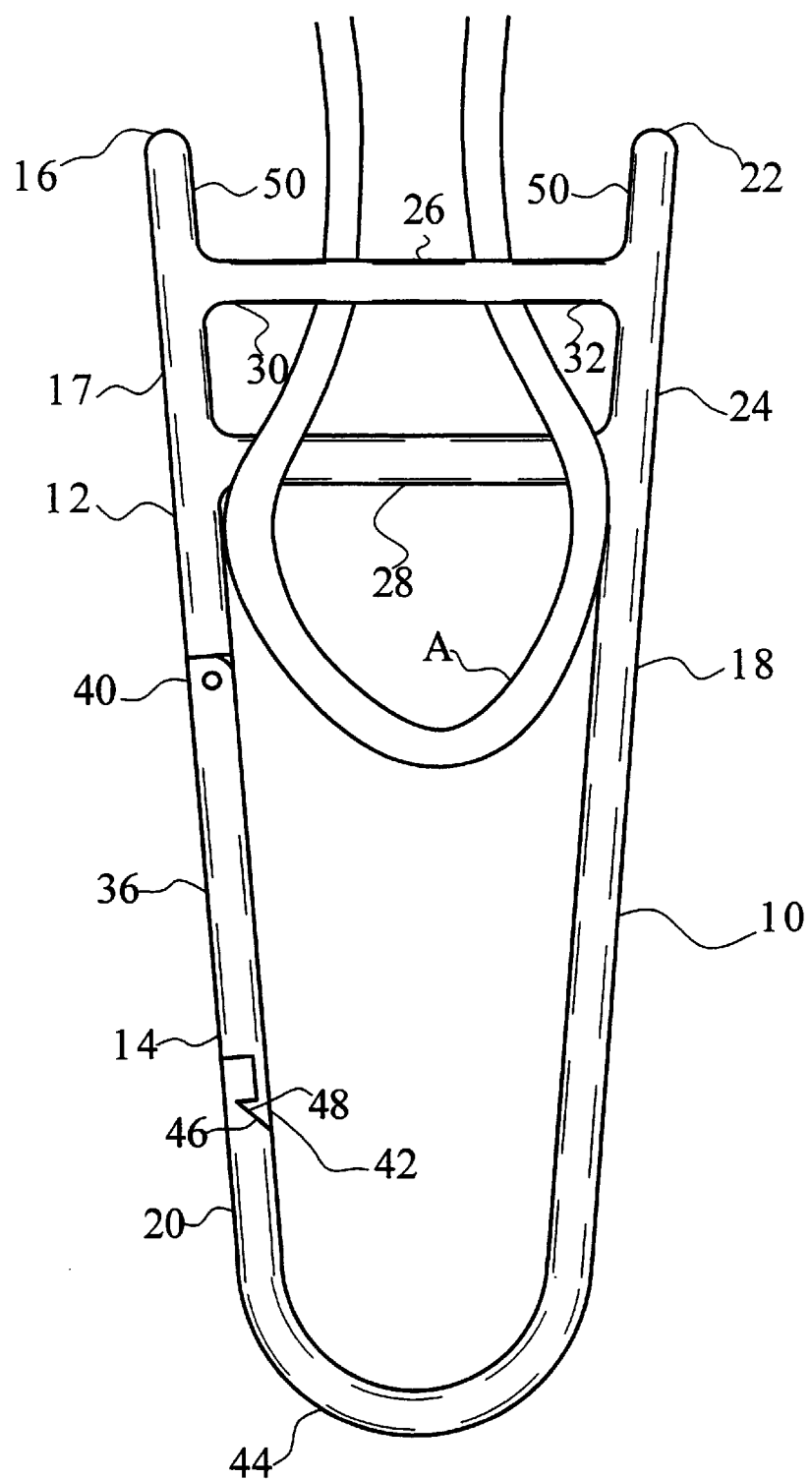
FIG. 2 is a front elevational view of the preferred embodiment of the invention, illustrating steps 1 and 2 of the preferred method of using the invention.
Figure 3:
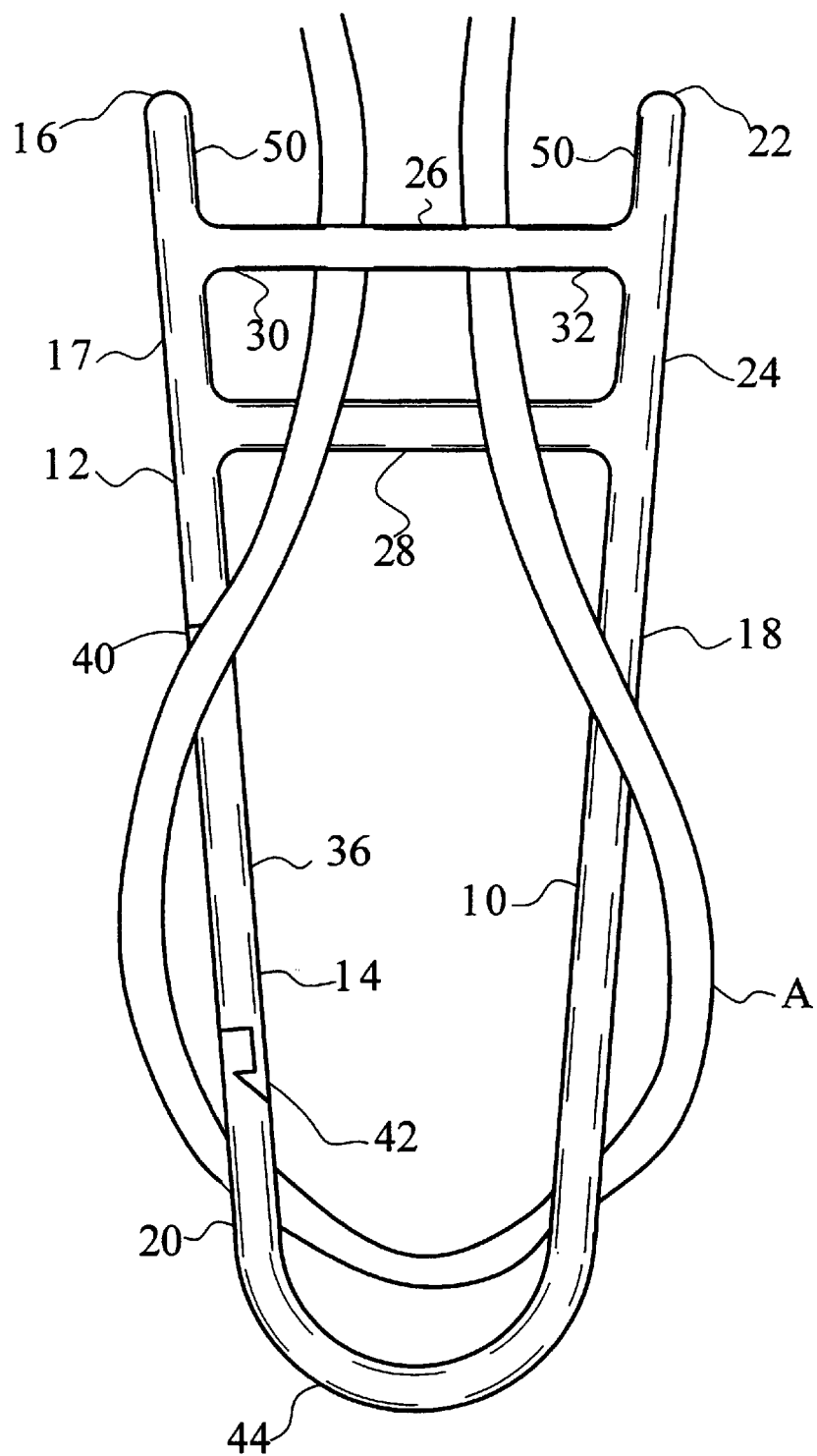
FIG. 3 is a front elevational view of the preferred embodiment of the invention, illustrating step 3 of the preferred method of using the invention.
Figure 4:
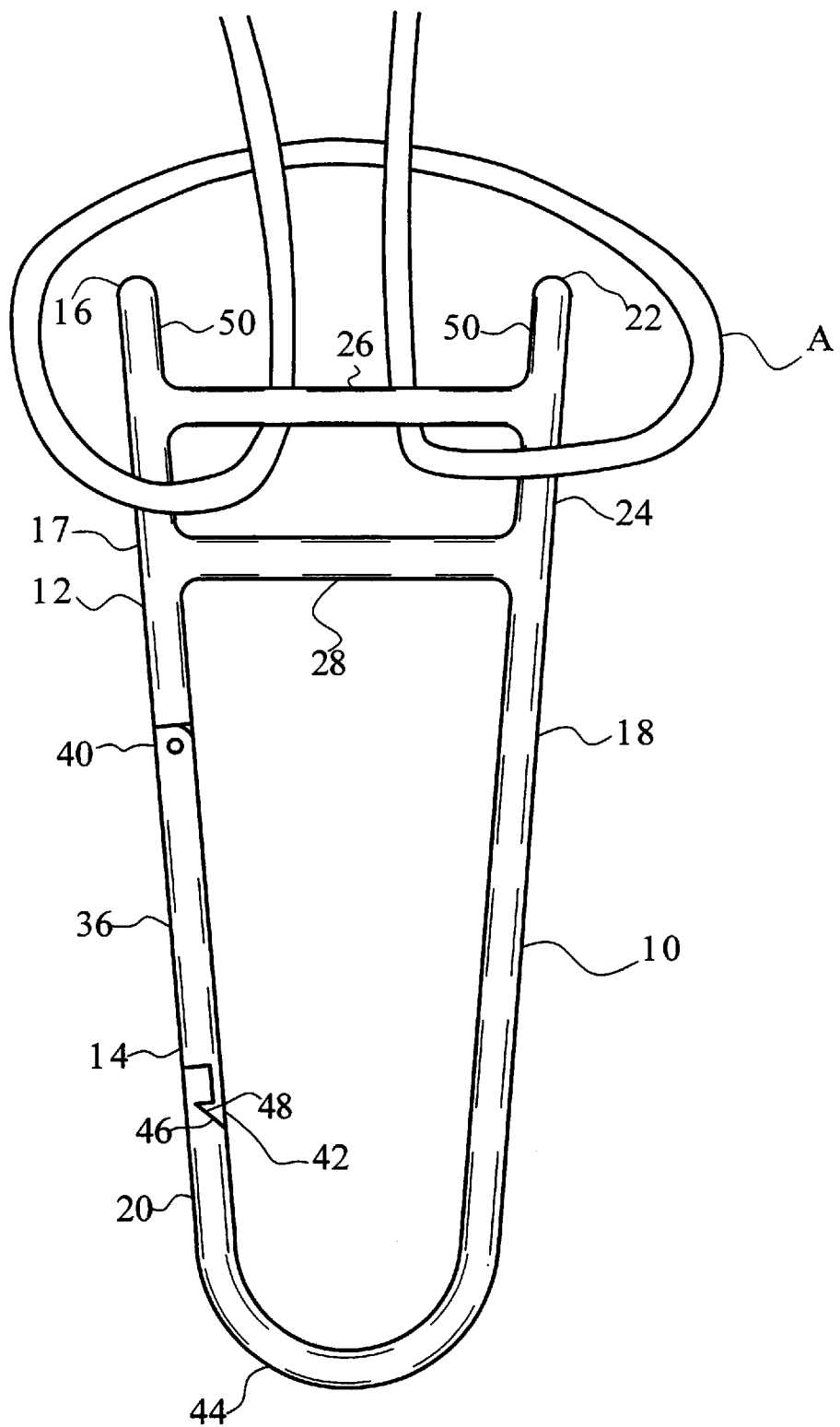
FIG. 4 is a front elevational view of the preferred embodiment of the invention, illustrating step 4 of the preferred method of using the invention.
Figure 5:
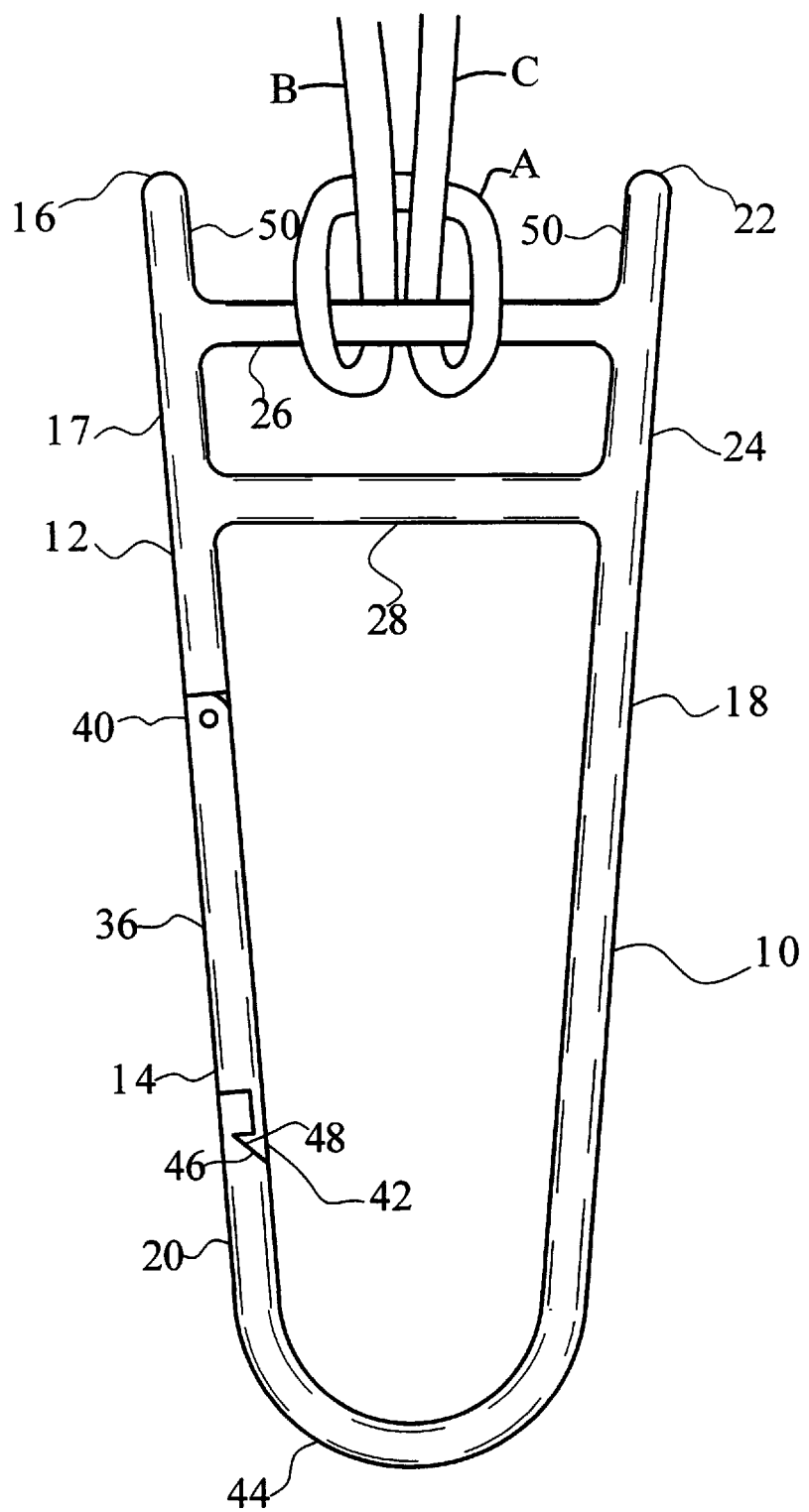
FIG. 5 is a front elevational view of the preferred embodiment of the invention, illustrating step 5 of the preferred method of using the invention.
Figure 6:
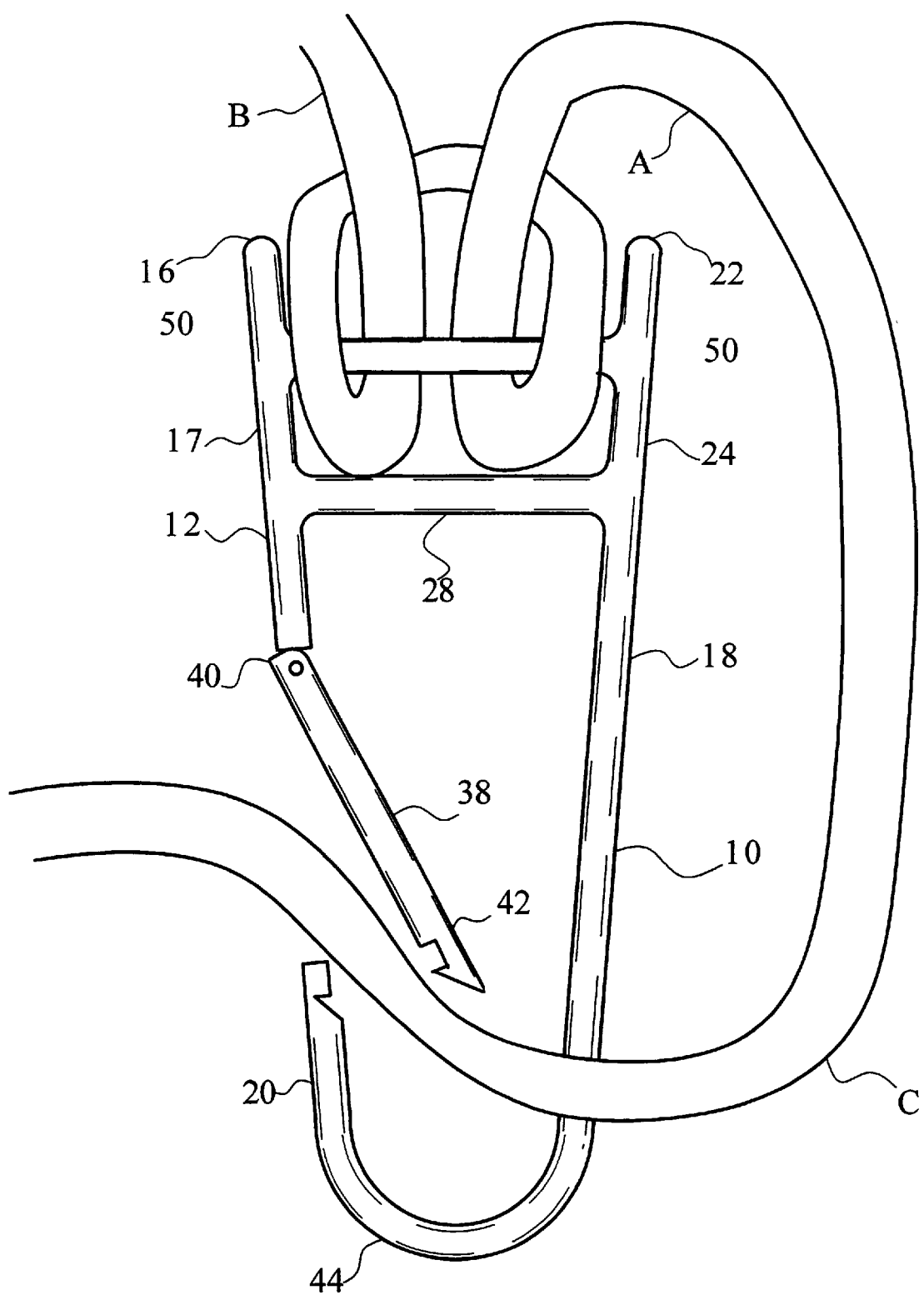
FIG. 6 is a front elevational view of the preferred embodiment of the invention, illustrating steps 6 and 7 of the preferred method of using the invention.
Figure 7:
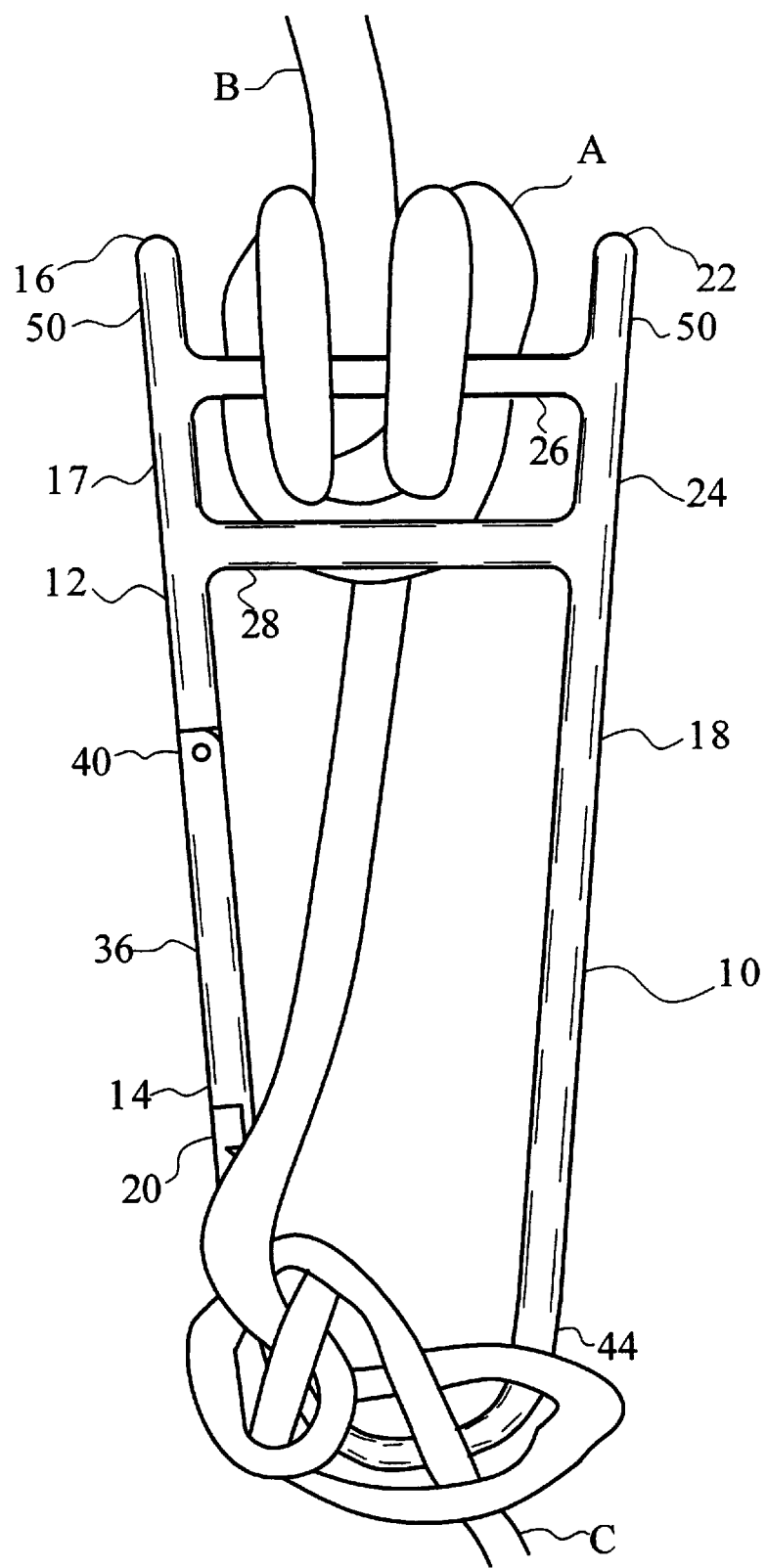
FIG. 7 is a front elevational view of the preferred embodiment of the invention, illustrating steps 8 and 9 of the preferred method of using the invention.

The following steps should be followed in using the invention:

1. Double a middle portion of a line (such as a rope, cord, cable, etc.) between top and bottom portions of the line, to form a loop.
2. Pull the loop A between the transverse members, as shown in FIG. 2.
3. Pull the loop around the bottom portion of the invention, as shown in FIG. 3.
4. Pull the loop from the bottom portion of the invention to the top portion of the invention, as shown in FIG. 4.
5. Pull the top portion B and the bottom portion C of the line to tighten the loop between the ears against the top and bottom portions, as shown in FIG. 5.
6. Move the clasping member to an open position, either manually or by pushing with the bottom portion of the line.
7. Pull the bottom portion of the line through the gap created by opening the clasping member, as shown in FIG. 6.
8. Release the clasping member so that it returns to the closed position.
9. Secure the bottom portion of the line to the bottom portion of the device, preferably by tying a double half hitch knot around the hooked portion of the second side member, as shown in FIG. 7.

This method makes it possible to make the lines that secure a load much tighter than can be done with a straight pull on the lines. Multiple mechanical trucker's knots can be used to secure different portions of a line. To untie the knots so that the load can be removed, one simply reverses the steps used in tying the knots.

The invention may be made in a variety of sizes for use with different lines.

It is to be understood that the present invention is not limited to the sole embodiment described above, but encompasses any and all embodiments within the scope of the following claims.

I claim:

1. A mechanical trucker's knot, comprising:

a first side member, having a first end, a second end, and an intermediate portion;

a second side member, having a first end, a second end, and an intermediate portion;

a first transverse member, having a first end joined to the second end of the first side member, and a second end joined to the second end of the second side member;

two ear members extending from the first transverse member in a direction opposite that of the side members; and a clasping member, capable of movement between a closed position toward which it is biased by a spring, in which the first side member, the second side member, the transverse member and the clasping member form a closed loop, and an open position in which there is an opening between the first end of the first side member and the first end of the second side member, the clasping member having a first end that is pivotally connected to the first end of the first side member, and a second end that in the closed position is retained on the first end of the second side member, and in the open position is not so retained; and a second transverse member, parallel to the first transverse member, having a first end joined to the intermediate portion of the first side member, and a second end joined to the intermediate portion of the second side member.

2. The mechanical trucker's knot according to claim 1, wherein the second side member is longer than the first side member, and the first end of the second side member is turned back to form a hook.

3. The mechanical trucker's knot according to claim 2, wherein the second end of the clasping member has extensions that matingly engage grooves in the first end of the second side member.

4. The mechanical trucker's knot according to claim 3, wherein the first side member, the second side member, the transverse member, and the locking clamp are made of metal.

5. The mechanical trucker's knot according to claim 4, wherein the first side member, the second side member, the transverse member, and the locking clamp are solid, and have, except at their ends, circular cross sections.

6. The mechanical trucker's knot according to claim 5, wherein the centers of the circular cross sections of the first side member, the second side member, the transverse member, and the locking clamp are all lie in a single plane, and the ears extend an equal distance from the first transverse member.

7. A method of tightening a line, comprising the steps of:

doubling a middle portion of a line, between top and bottom portions of the line, to form a loop;

pulling the loop between transverse members of a device wherein the transverse members are joined to two side members;

pulling the loop around a bottom portion of the device wherein the side members are connected by a clasping member in a closed position, the clasping member being biased toward the closed position;

pulling the loop from the bottom portion of the device to a top portion of the device wherein the side members extend beyond the transverse members to form ears;

pulling the top and bottom portions of the line to tighten the loop between the ears against the top and bottom portions;

moving the clasping member to an open position wherein there is a gap between bottom portions of the side members;

pulling the bottom portion of the line through the gap between the bottom portions of the side members;

releasing the clasping member so that it returns to the closed position; and securing the bottom portion of the line to the bottom portion of the device.

8. A method of tightening a line according to claim 7, wherein the bottom portion of the line is secured to the bottom of the device by a half hitch knot around a portion of one of the side members.

* * * * *